(No Model.)

E. LIND.
SEEDING DEVICE.

No. 298,761. Patented May 20, 1884.

WITNESSES:
P. N. Magrath
J. W. Hill

INVENTOR,
Emile Lind
BY J. C. Higdon
ATTORNEY.

N. PETERS, Photo-Lithographer, Washington, D. C.

UNITED STATES PATENT OFFICE.

EMILE LIND, OF HIAWATHA, KANSAS.

SEEDING DEVICE.

SPECIFICATION forming part of Letters Patent No. 298,761, dated May 20, 1884.

Application filed January 31, 1884. (No model.)

*To all whom it may concern:*

Be it known that I, EMILE LIND, a citizen of the United States, residing at Hiawatha, in the county of Brown and State of Kansas, have invented certain new and useful Improvements in Seeding Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in attaching to a corn or seed planter an improved sprocket-chain to operate the seed wheel or plate, said chain having a reversible lug pivoted longitudinally to each link or every alternate link, as may be desired.

Figure 1:
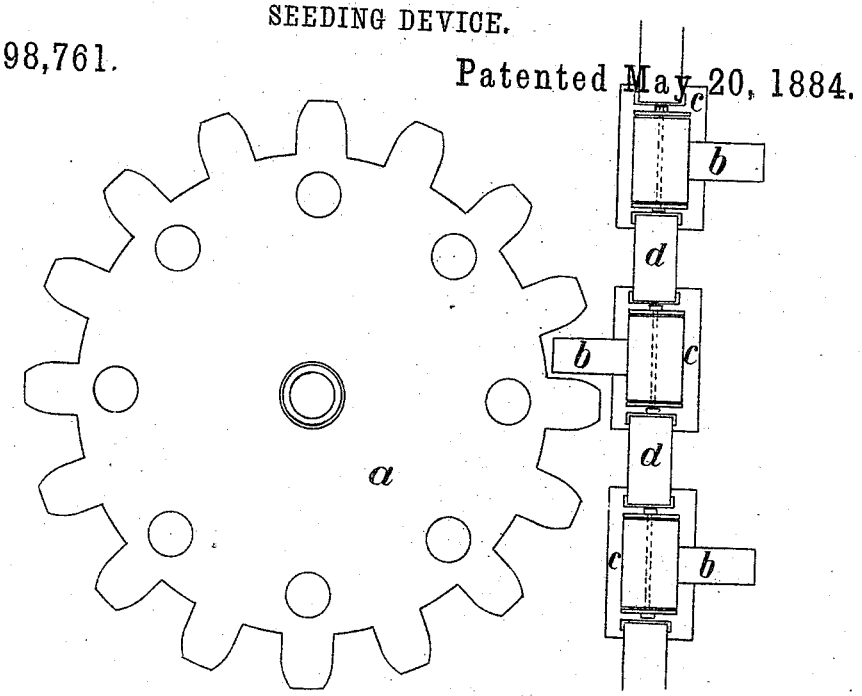
Figure 2:
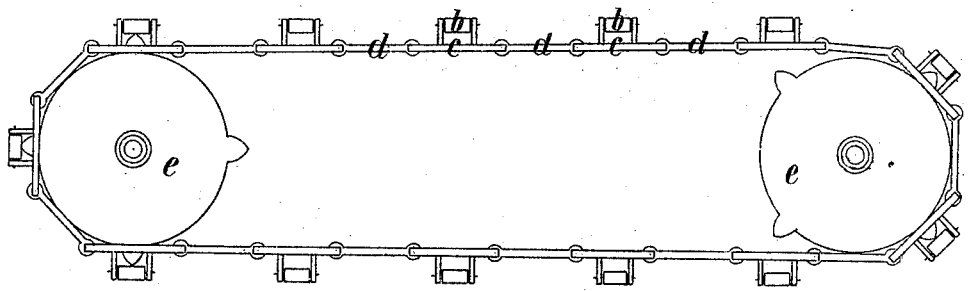

Figure 1 is a plan view of a seed-plate with several links of said chain in proper position for operation. Fig. 2 shows in elevation an endless chain in position upon two sprockets, either of which may act as the driving-wheel.

A represents a seed-distributing wheel of any approved construction, adapted to be driven intermittently, as desired, by the lugs B, pivoted to project at a right angle from the length of the links C and connecting-links D. The lugs B are reversible and may be thrown from one side to the other of the chain, in or out of gear with the teeth on the wheel A, according to the distance apart it is desired to drop the seed. For instance, to drop very close, all the lugs B are thrown in gear with the seed-wheel A, and, on the other hand, by reversing all of the lugs except one, seed may be planted such a distance apart as corresponds with the full length of the chain, while with a common drill dropping can only be accomplished at comparatively shorter intervals.

The chain-links C are preferably constructed of malleable iron, and of the form shown in Figs. 1 and 2—that is, the lug-links C have near each end and projecting from the side opposite the driving-wheels E ears or lugs, between which the lugs B are pivoted, as shown. My chain may be constructed with the reversible lugs attached to every link, thus doing away with the connecting-links D.

To prevent sagging, it is preferable to provide a support for the chain near the point where the lugs come in contact with the teeth of the seed-wheel, and for this purpose an anti-friction roller is provided.

Having thus described my invention, I claim as new and desire to secure by Letters Patent—

1. In an attachment for seed-drills, a chain composed of sprocket-links having pivoted reversible lugs attached to the non-bearing or out side, said lugs adapted to be thrown in or out of gear with the teeth of a seed wheel or plate, substantially as described.

2. In a seed-drill attachment, the combination, with the link C, of the reversible lug B and the toothed seed wheel or plate A, substantially as shown, and for the purpose set forth.

In testimony whereof I affix my signature in presence of two witnesses.

EMILE LIND.

Witnesses:
HENRY D. ASHLEY,
W. L. WOOD.